(12) United States Patent
Danielsson et al.

(10) Patent No.: US 10,496,903 B2
(45) Date of Patent: Dec. 3, 2019

(54) USING IMAGE ANALYSIS ALGORITHMS FOR PROVIDING TRAINING DATA TO NEURAL NETWORKS

(71) Applicant: Axis AB, Lund (SE)

(72) Inventors: Niclas Danielsson, Lund (SE); Xing Danielsson Fan, Lund (SE)

(73) Assignee: Axis AB, Lund (SE)

( * ) Notice: Subject to any disclaimer, the term of this patent is extended or adjusted under 35 U.S.C. 154(b) by 97 days.

(21) Appl. No.: 15/725,029

(22) Filed: Oct. 4, 2017

(65) Prior Publication Data

US 2018/0096232 A1 Apr. 5, 2018

(30) Foreign Application Priority Data

Oct. 4, 2016 (EP) ..................................... 16192142

(51) Int. Cl.
*G06K 9/66* (2006.01)
*G06K 9/62* (2006.01)
*G06N 3/08* (2006.01)

(52) U.S. Cl.
CPC ............. *G06K 9/66* (2013.01); *G06K 9/6202* (2013.01); *G06K 9/6212* (2013.01); *G06N 3/08* (2013.01)

(58) Field of Classification Search
CPC ...... G06K 9/66; G06K 9/6212; G06K 9/6202; G06N 3/08
See application file for complete search history.

(56) References Cited

FOREIGN PATENT DOCUMENTS

CN 104679863 A 6/2015
CN 105430394 A 3/2016

OTHER PUBLICATIONS

Chaabouni et al: "Deep Learning for Saliency Prediction in Natural Video", arXiv, Apr. 27, 2016 (Year: 2016).*
Sun et al: "Human Action Recognition using Factorized Spatio-Temporal Convolutional Networks", IEEE, 2015. (Year: 2015).*
"Saliency Detection by Multi-Context Deep Learning", Rui Zhao et al.; 2015 IEEE Conference on Computer Vision and Pattern Recongnition (CVPR), IEEE, Jun. 7, 2015, pp. 1265-1274, XP032793534.
"Two Stream Convolutional Networks for Dynamic Saliency Prediction", Bak et al.; arxiv.org., Cornell University Library, 201 Olin Library Cornell University, Itaca, NY 14853, Jul. 16, 2016, XP080716140.
"A Performance Evaluation of Fusion Techniques for Spatio-Temporal Saliency Detection in Dynamic Scenes", Satya Muddamsetty, et al.; IEEE International Conference on Image Processing, Sep. 1, 2013, pp. 1-6, XP055356974, retrieved from the Internet: URL:https://hal.archives-ouvertes.fr/hal-00835782/document [retrieved on Mar. 21, 2017].
"Finding Action Tubes", Gkioxari Georgia et al., 2015 IEEE Conference on Computer Vision and Pattern Recognition (CVPR), IEEE, Jun. 7, 2015, pp. 759-768, XP032793486.

(Continued)

*Primary Examiner* — Ruiping Li
(74) *Attorney, Agent, or Firm* — Volpe and Koenig, P.C.

(57) ABSTRACT

A method, computer program, computer and system for training a neural network that receives a plurality of input digital images and, for each specific input digital image, outputs data for determining a relevance level of groups of pixels in the specific input digital image.

8 Claims, 3 Drawing Sheets

(56) References Cited

OTHER PUBLICATIONS

"Deep Learning for Saliency Prediction in Natural Video", Souad Chaabouni et al.; arxiv.org, Cornell University Library, 201 Olin Library Cornell University, Ithaca, NY 14853, Apr. 27, 2016, XP080698227.

"Predicting Eye Fixations Using Convolutional Neural Networks", Nian Liu et al.; 2015 IEEE Conference on Computer Vision and Pattern Recognition (CVPR), IEEE, Jun. 7, 2015, pp. 362-370, XP032793465.

"Visual Saliency Based on Multiscale Deep Features", Guanbin Li et al.; 2015 IEEE Conference on Computer Vision and Pattern Recognition (CVPR), IEEE, Jun. 7, 2015, pp. 5455-5463, XP032794015.

"A Method for Selective Color Images Compression", Gomes et al.; IEEE Proceeding of the International Joint Conference on Neural Networks; Portland, OR; Jul. 20-24, 2003; pp. 1207-1212.

"Low Bit-Rate Coding of Image Sequences Using Adaptive Regions of Interest", Doulamis et al., IEEE Transactions on Circuits and Systems for Video Technology; vol. 8, Issue 8, Dec. 1998; pp. 928-934.

"Multimedia Coding Using Adaptive Regions of Interest", Bojkovic et al., IEEE 2004 7th Seminar on Neural Network Applications in Electrical Engineering, Belgrade, Serbia, Sep. 23-25, 2005; pp. 67-71.

EP 16192142.4 European Search Report (dated Mar. 29, 2017).
EP 16192142.4 Extended Search Report (dated May 9, 2017).

* cited by examiner

USING IMAGE ANALYSIS ALGORITHMS FOR PROVIDING TRAINING DATA TO NEURAL NETWORKS

FIELD OF INVENTION

The invention relates generally to a method, computer program, computer and system for training a neural network that receives a plurality of input digital images and for each specific input digital image outputs data for determining a relevance level of groups of pixels in the specific input digital image.

BACKGROUND

Many applications in image processing require a variable assignment of resources to different image regions. For example, compression parameters can be selected based on certain characteristics of the image, or image regions can be subject to variable degrees of error correction to achieve an optimum trade-off between transmission reliability and efficiency etc. Automatic identification of relevance levels of image regions to determine how much resources that should be assigned to a specific image region is a non-trivial problem, and running such algorithm may also require valuable CPU time. This can cause problems, e.g. if many programs are competing for limited resources on an embedded platform such as a monitoring camera.

There is thus a need for improvements within this context. There exists the need to solve or at least reduce one or several of the drawbacks discussed above.

SUMMARY

According to a first aspect, a method for training a neural network that receives a plurality of input digital images and for each specific input digital image outputs data for determining a relevance level of groups of pixels in the specific input digital image is disclosed. The method comprises determining a training data set by: for a plurality of digital training images, determining a relevance level for groups of pixels in each specific digital training image of the plurality of digital training images by using a first image analysis algorithm configured to automatically label the group of pixels with a relevance level, including the plurality of digital training images and the labels as the training data set, and using the training data set for training of the neural network.

By the term "neural network" should, in the context of present specification, be understood interconnected group of nodes, similar to the vast network of neurons in a brain. Neural network may also be named "artificial neural network" (ANN). A specific type of neural network that may be used in this context is a convolutional neural network (CNN). The term "Deep learning" is also commonly used.

By the term "relevance level" should, in the context of the present specification, be understood a grading of interest (e.g. to a user) of the image content of the corresponding region in the image. In other words, the relevance level corresponds to a region (group of pixels) in the image, and the relevance level define how interesting the image content of that region is for a viewer of the image. This may advantageously be used for distributing a bit rate budget on the image. For example, the relevance level may be used for controlling the degree of compression of the corresponding region, e.g. through setting a compression level, or determining how aggressive the encoder should do skip coding for that region etc. The relevance level may further be used for error coding purposes, e.g. to determine a degrees of error correction when transmitting the encoded image. A relatively higher relevance level for a specific region of an image means that a larger part of the bit rate budget may be spent on that specific region compared to another image region where the relevance level is lower.

Other terms which may be used instead of relevance level in prior art includes "region of interest" or "ROI".

By the term "image analysis algorithm configured to automatically label the group of pixels with a relevance level" should, in the context of present specification, be understood any suitable algorithm that can be used for automatically (e.g. by means of a computer, without human assistance) grade the interest (e.g. to a user) of the image content of the corresponding region (for example macro blocks) in the image based on image characteristics (i.e. image analysis) of that portion. The image characteristics may be spatial, for example edges present in the portion of the digital image, the presence of noise, repetitively textured portions, face recognition, object detection etc. The image characteristics may also be temporal, e.g. motion detection. An example of a suitable image analysis algorithm is the Zipstream algorithm provided by Axis Communication. Parts of this algorithm is for example described in European patent application with number EP3021583.

Employing a neural network which is trained using an existing image analysis algorithm as described above has several advantages. For example, the design of a neural network is very simple and lends itself well to hardware implementations since a neural network function by a huge amount of very repetitive but very simple calculations. Moreover, ongoing work being done in the area of model compression makes the use of neural networks gradually more feasible to put on embedded platform such as a monitoring camera. As such, the use of a neural network in e.g. an embedded platform such as a monitoring camera may be advantageous over running the actual image analysis algorithm in the camera.

According to some embodiments, the first image analysis algorithm is configured to automatically label the group of pixels with a relevance level by: calculating a spatial statistical measure for the group of pixels and calculating a temporal statistical measure for the group of pixels by applying a temporal filtering on a sequence of images of the plurality of digital training images, the sequence of images including the specific digital training image.

The two statistical measures may then be used for calculating a weighted statistical measure by weighting the temporal statistical measure and the spatial statistical measure for the group of pixels and labeling the group of pixels with a relevance level based on the weighted statistical measure. The weight used may be a static weight, for example 0.5, 0.3, 0.7 etc., or it may vary based on image characteristics of the concerned image regions.

According to some embodiments, determining the training data set comprises: for a second plurality of digital training images, determining a relevance level for groups of pixels in each specific digital training image of the second plurality of digital training images by using a second image analysis algorithm configured to automatically label the group of pixels with a relevance level, wherein the second image analysis algorithm differs from the first image analysis algorithm.

For example, for a (smaller) plurality of images, a more complex or specialized image analysis algorithm may be employed to provide the neural network with training data pertaining to e.g. a specific contents of digital images. An example of such specific content may be image content showing traffic, or showing an entrance where many persons is walking by the camera etc.

An advantage of the present embodiment is that neural networks have the potential to have far superior performance compared to handcrafted algorithms such as the first image analysis algorithm, if they are trained right. An advantage of the present embodiment is that a huge amounts of training data can be generated from to first image analysis algorithm to quickly get the algorithm to perform on par with that algorithm. After this, the neural network can be fine-tuned with other, more "advanced" training data such as the second plurality of images and its levels (determined by the second image analysis algorithm). Also fine-tuning typically requires much less data than the initial training (i.e. using the first plurality of images). In other words, a goal of doing second training is to provide user-specific relevance levels. Some areas of images are important for some users but not interesting for other type of use cases. Adding this second training (using the second plurality of images and the second image analysis algorithm) may facilitate that bit rate budget are spent on relevant areas for the users.

The second plurality of digital training images may comprise at least one digital training image being part of the first plurality of digital training images. The second plurality of digital training images may for example consist of a subset of the first plurality of training images. The second plurality of digital training images may also comprise at least one digital training image not being part of the first plurality of digital training images, i.e. the second plurality of digital training images is not being a subset of the first plurality of digital training images.

According to some embodiments, the training data set is further determined by manually label group of pixels in at least one digital training image among of first the plurality of digital training images with a relevance level. According to other embodiments, the training data set is further determined by manually label group of pixels in at least one digital training image among of second the plurality of digital training images with a relevance level. Manually labeling groups of pixels among the images of the training data set may be used for fine-tuning the training data set. Using the same arguments as discussed above in conjunction with the use of the second plurality of images and the second image analysis algorithm, this embodiment may facilitate that bit rate budget are spent on relevant areas for the users.

In a second aspect, a computer program product comprising a computer-readable storage medium with instructions adapted to carry out the method of the first aspect when executed by a device having processing capability is disclosed.

In a third aspect, a computer comprising a processor arranged for training a neural network that receives a plurality of input digital images and for each specific input digital image outputs data for determining a relevance level of groups of pixels in the specific input digital image, wherein the training of the neural network comprises, determining a training data set by: for a plurality of digital training images, determining a relevance level for groups of pixels in each specific digital training image of the plurality of digital training images by using a first image analysis algorithm configured to automatically label the group of pixels with a relevance level, including the plurality of digital training images and the labels as the training data set, and using the training data set for training of the neural network is disclosed.

In a fourth aspect, a system comprising a video camera and a computer is disclosed. The computer has a processor arranged for training a neural network that receives a plurality of input digital images and for each specific input digital image outputs data for determining a relevance level of groups of pixels in the specific input digital image, wherein the training of the neural network comprises, determining a training data set by: for a plurality of digital training images, determining a relevance level for groups of pixels in each specific digital training image of the plurality of digital training images by using a first image analysis algorithm configured to automatically label the group of pixels with a relevance level, including the plurality of digital training images and the labels as the training data set, and using the training data set for training of the neural network. The processor is further arranged for providing a resulting trained neural network to the camera, and the camera is arranged for receiving the trained neural network. The camera is further arranged for capturing a plurality of digital images, providing image data of the plurality of digital images to the trained neural network and for each specific digital image of the plurality of digital images, obtaining a plurality of relevance levels, each corresponding to a group of pixels in the specific digital image.

By the term "trained neural network" should, in the context of present specification, be understood e.g. a text file that specifies the setup of nodes in the neural network (how the nodes are interconnected), and weights (filter, weight bank, etc.) used in the neural network. Other ways of providing the trained neural network between the computer and the camera are equally possible, for example via a binary file.

According to some embodiments the camera is further arranged for encoding the specific digital image by controlling a degree of compression of the specific digital image according to the obtained relevance levels.

The degree of compression may be controlled by setting a compression ratio for a certain portion (region, area, etc.) of the image. The compression ratio may be embodied by a quantization parameter value, QP-value, ranging from e.g. 0-51 (H.264), 1-255 (VP 9), or 1-100. It should be noted that in this description, the terms "degree of compression", "compression ratio" and "compression level" are used interchangeably, in a broad sense, to denote encoding of pixels using fewer bits than the original, uncompressed, representation of the pixel. As described above, the other parts of the encoding process may be based on the relevance level, such as the error coding, e.g. to determine a degrees of error correction when transmitting the encoded image based on the relevance level.

The second, third and fourth aspect may generally have the same features and advantages as the first aspect.

BRIEF DESCRIPTION OF THE DRAWINGS

A more detailed understanding may be had from the following description, given by way of example in conjunction with the accompanying drawings where.

DETAILED DESCRIPTION

Figure 1:
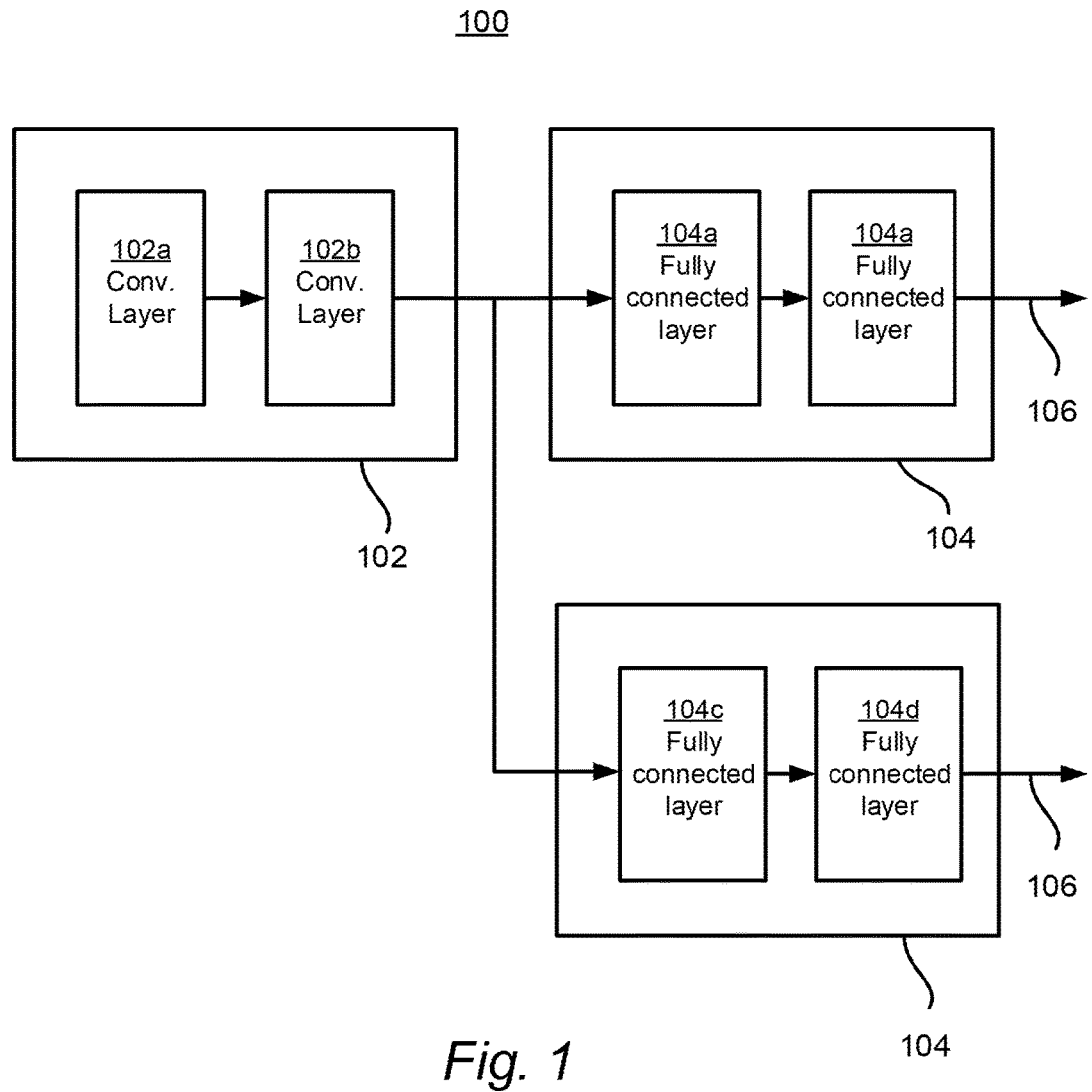
FIG. 1 schematically shows a convolutional neural network.

FIG. 1 shows by way of example a convolutional neural network (CNN) 100. In the context of this specification it should be noted the use of a CNN for determining a relevance level of groups of pixels in an input digital image is just by way example. Any suitable neural network architecture may be employed for this purpose, for example another type of feedforward neural network (i.e. other than a CNN), recurrent network etc. In a CNN 100, two types of layers may exist, convolutional layers 102 and fully connected layers 104. It is envisaged that the fully connected layer may be replaced with a layer having more than one output. In a CNN 100, any number of the two different layers may be present. In FIG. 1, two convolutional layers 102a, 102b exist. To the convolutional layers 102, two regression heads 104 are added. A regression head 104 is in this example a set of fully connected layers 104a-b; 104c-d which are fed with the output 106 from the convolutional layers 102. An advantage of a CNN in this context may be that the same set of convolutional layers 102 (configured with filters and filter weights adapted for image analysis purposes) can be used for the purpose of determining relevance levels. To this set 102, an extra regression head 104 may be added (the set of convolutional layers 102 are already connected to other regression head(s) trained for other image analysis purposes). The extra regression head may then be trained to determine relevance levels using the output data 106 from the convolutional layers 102. The computational complexity of a regression head 104 is often low compared to a set of convolutional layers 102, and thus puts little extra demand on the hardware running the neural network 100.

Figure 2:
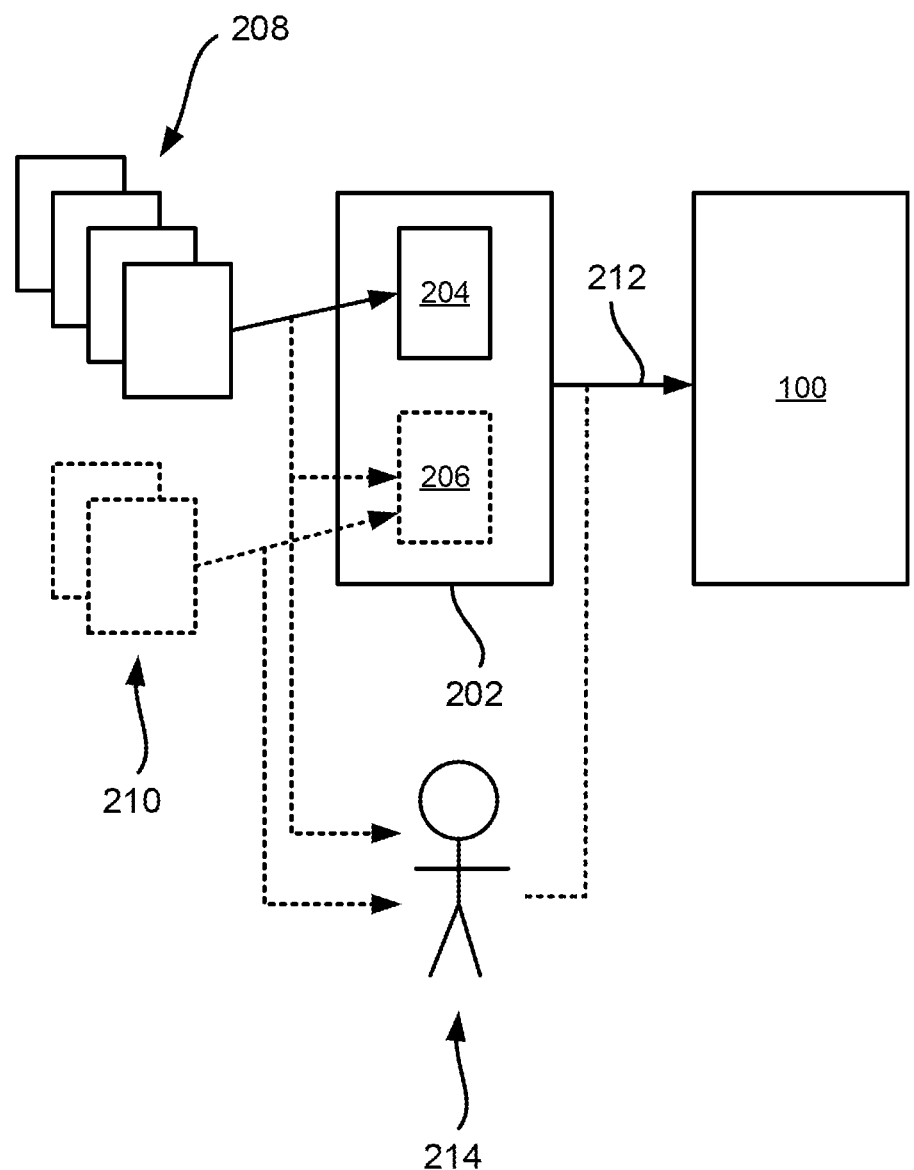
FIG. 2 shows how a neural network is trained according to embodiments.
Figure 4:
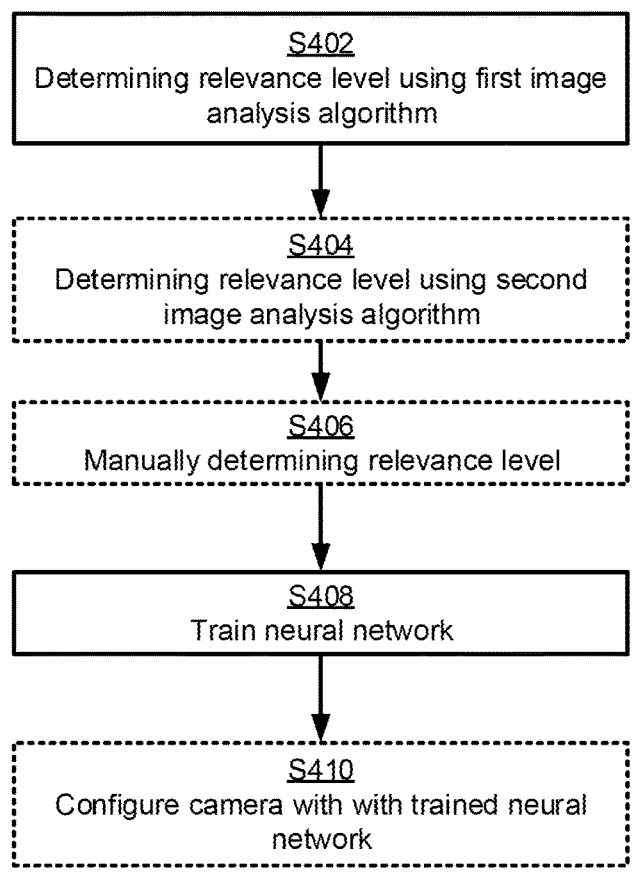
FIG. 4 shows a method for training a neural network according to embodiments.

FIG. 2 shows by way of example a device 200 arranged for training a neural network 100. Embodiments of the training will now be explained in conjunction with FIGS. 2 and 4. The device 200 may be any device having processing capabilities, hereinafter referred to a computer 200. The computer 200 may determine a training data set 212 by first receiving a plurality of digital training images 208. The digital training images 208 may then be fed to a first image analysis algorithm 204 which is configured to determine S402 and automatically label groups of pixels in each of the digital training images 208 with a relevance level. The first image analysis algorithm 204 may, according to some embodiments, focus on spatial statistical measures of the digital training images. In this case, each digital training image can be handled separately by the first image analysis algorithm 204. A typical spatial statistical measure may be edge detection, color distribution, face detection and spatial noise detection. Alternatively, or additionally, the first image analysis algorithm 204 may also take into consideration temporal features of the digital training images such as movements of objects in a sequence of the digital training images. For this reason, the first image analysis algorithm may be configured to calculate a temporal statistical measure for group of pixels in each specific digital training images by applying a temporal filtering on a sequence of images of the plurality of digital training images, the sequence of images including the specific digital training image. In this case, the first image analysis algorithm 204 needs to consider a plurality of digital training images in one run of the algorithm, i.e. when calculating a temporal statistical measure for a specific group of pixels in a specific digital training image. Examples of temporal statistical measures are motion detection, temporal noise detection, detection of change of lighting conditions between images etc.

In the case that both a spatial statistical measure and a temporal statistical measure is calculated for a specific group of pixels, the first image analysis algorithm 204 may be configured to calculate a weighted statistical measure by weighting the temporal statistical measure and the spatial statistical measure for the group of pixels and labeling the group of pixels with a r based on the weighted statistical measure. The applied weight may be anywhere between 0 and 1 (in case temporal statistical measure and the spatial statistical measure are normalized, otherwise other range of weights applies) and depends on the focus area of the first image analysis algorithm 204.

For example, if the first image analysis algorithm 204 is adapted to spend bit rate budget on parts of images comprising moving humans, the algorithm should label such parts of the images with a high relevance level. The first image analysis algorithm needs to, in this embodiment, calculate corresponding spatial and temporal statistical measures to determine if a group of pixels in an image corresponds to a moving human. Another example may be that the first image analysis algorithm 204 is arranged focus on preserving areas showing a street in full detail (i.e. spend bit rate budget on such areas), in this case only a spatial statistical measure may be needed to be calculated.

In summary, the first image analysis algorithm 204 is configured to automatically label specific group of pixels in each digital training image 208 with a relevance level. For the embodiments where only the first image analysis algorithm 204 is used for this purpose, the plurality of digital training images 208 and the calculated labels will form the training data set 212.

According to some embodiments, the determining of the training data set 212 comprises running a second plurality of digital training images through a second image analysis algorithm 206.

The second plurality of digital training images may be a subset of the first plurality of digital training images 208.

Alternatively, the second plurality of digital training images is not a subset of the first plurality of digital training images 208.

For example, the second plurality of digital training images may be targeted to specific range of application for the neural network, e.g. traffic situations, casino, retail, bank, airplane monitoring etc. For this reason, it may be advantageous to analyze images 210 showing such situations using a second image analysis algorithm 206 which also may be targeted towards these specific situations. In other words, according to some embodiments, first image analysis algorithm 204 may be a more general algorithm functioning well on all sorts of image content while the second image analysis algorithm 206 is targeted towards specific image content. According to some embodiments, the first image analysis algorithm 204 may be less computationally complex and thus possible to run on very many images (e.g. >10000 or >1000000) while the second image analysis algorithm 206 may be more computationally complex.

The computer 200 may thus be arranged to, for a second plurality of digital training images, determining S404 a relevance level for groups of pixels in each specific digital training image of the second plurality of digital training images by using the second image analysis algorithm configured to automatically label the group of pixels with a relevance level, wherein the second image analysis algorithm differs from the first image analysis algorithm. As described above, the first image analysis algorithm may be a general purpose algorithm functioning equally well on all types of input images, while the second image analysis algorithm may provide a more profile-based analysis (i.e. be targeted towards images with some specific content or showing specific situations).

According to some embodiments, the training data set 212 is further determined S406 by manually (by a human 214) label group of pixels in at least one digital training image among of first the plurality of digital training images with a relevance level. Alternatively, or additionally, the training data set 212 is further determined by manually label group of pixels in at least one digital training image among of second the plurality of digital training images with a relevance level. This embodiment may be advantageous in case the training data set needs to be fine-tuned towards some specific feature in the digital training images which the first and/or second image analysis algorithm 204, 206 could not correctly label with a relevance level. The training data set 212 may according to some embodiments further be determined by manually label group of pixels in at least one further digital training image (not being part of the first/second plurality of digital training images) with a relevance level and include the at least one further digital training image and the corresponding labels in the training data set. This embodiment is not included in FIG. 2.

The training data set 212 thus comprises the plurality of digital training images that have been analyzed by the first and/or second image analysis algorithm 204, 206 as well as the labels, possibly fine-tuned by a human 214.

The training data set 212 is then used for training S408 the neural network 100. The training of the neural network 100 using the training data set 212 is left to the skilled person to implement and is done according to the architecture of the neural network 100 used. Generally, the neural network is trained to provide a map of relevance levels for each input digital image by tuning its internal weights using a loss function and the labels as ground truth for groups of pixels in the training digital images. The loss function may, e.g., be based on an L2-norm, leading to a minimization of a mean squared error. The loss function may be defined based on e.g. the number of possible relevance levels, size of input data etc. When the loss function has been defined, the weight updates usually through a standardized backpropagation algorithm together with e.g. stochastic gradient descent for the optimizer. As known to the skilled person, stochastic gradient descent is the most well-known method for calculating how to update the weights in the neural network so as to get a model that is as close as possible to producing the desired output based on the input images during training.

It should be noted that if the second plurality of training images is used for training and is a subset of the first plurality of training images, then the second plurality of digital training images and its corresponding labels is typically used for training of the neural network after the neural network has been trained with the first plurality of digital training images.

For example, tens of thousands of images are inputted into the neural network 100 during training and the internal weights of the neural network 100 are tuned until it can produce results comparable (or better) to the first and/or second image analysis algorithm 204, 206 on digital images not part of the training digital images but in a much quicker and less computational complex way.

Figure 3:
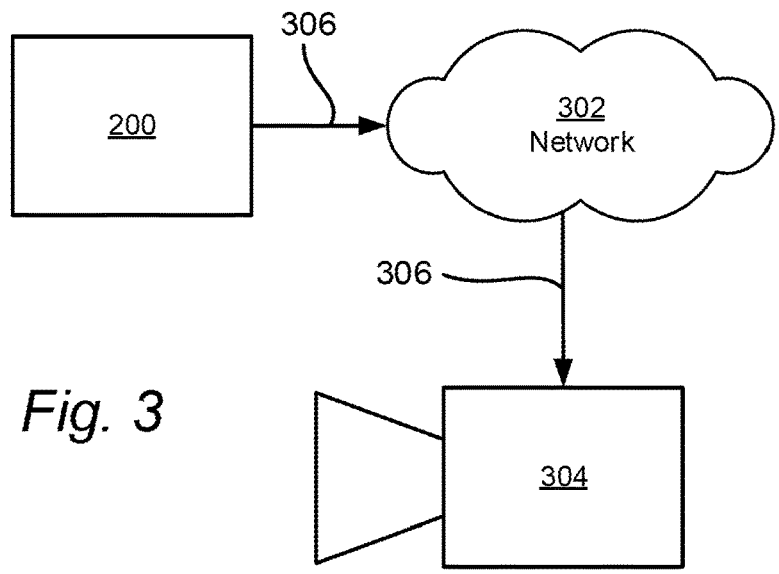
FIG. 3 shows a system comprising a video camera and a computer according to embodiments.

Due to the design of a neural network, an advantageous area of use is in a device with may have low available computational resources (e.g. not enough to run the first/second image algorithms) such as a video camera but with hardware specifically designed to run a neural network, such as an application specific integrated circuit (ASIC). For this reason, the device 200 may be arranged to provide the trained neural network to such device 304, for example via a wireless network 302, whereby the device is configured S410 with the trained neural network. This is shown in FIG. 3. It should be noted that the trained neural network may be delivered in any suitable way, such as a text file comprising the internal filters and weights of the trained neural network. It should also be noted that any other means of delivery of the trained neural network to the camera may be used, such as a computer memory (e.g. USB) or a wired connection. The camera is then arranged to use the trained neural network for determine a relevance level of images captured by the camera 304 and then encoded the images accordingly. For this reason, the camera 304 may be arranged to capture a plurality of digital images, and provide image data of the plurality of digital images to the trained neural network and for each specific digital image of the plurality of digital images, obtain a plurality of relevance levels, each corresponding to a group of pixels in the specific digital image.

According to some embodiment, the camera may be arranged to encode the specific digital image by controlling a degree of compression of the specific digital image according to the obtained plurality of relevance levels. The mapping between the relevance level and the degree of compression may be linear, i.e. a relatively higher relevance level may always correspond to a lower degree of compression of the corresponding group of pixels compared to a relatively lower relevance level. According to other embodiments, the mapping is stepwise, i.e. a range of relevance levels map to the same degree of compression. The mapping also needs to consider the available bandwidth such that it is not exceeded in case many areas of an image, or a sequence of images, comprises image content which is considered as relevant.

As described above, according to some embodiments, the camera 304 may comprise dedicated hardware for running the neural network. In other embodiments, a software implementation of the neural network is used for obtaining the relevance level to be used. In any event, the achieved result by using a neural network as described above may be substantially improved compared to actually running the first/second image analysis algorithms 204, 206 to obtain the relevance level.

What is claimed is:

1. A method for training a neural network that receives a plurality of input digital images and for each specific input digital image outputs data for determining a relevance level for groups of pixels in the specific input digital image, the method comprising:
   determining a training data set by:
      for a first plurality of digital training images, determining a relevance level for groups of pixels in each specific digital training image of the first plurality of digital training images by using a first image analysis algorithm configured to automatically label the group of pixels with a relevance level, wherein the first image analysis algorithm is configured to automatically label the group of pixels with a relevance level by:
         calculating a spatial statistical measure for the group of pixels;
         calculating a temporal statistical measure for the group of pixels by applying a temporal filtering on a sequence of images of the first plurality of digital training images, the sequence of images including the specific digital training image;

calculating a weighted statistical measure by weighting the temporal statistical measure and the spatial statistical measure for the group of pixels; and labeling the group of pixels with a relevance level based on the weighted statistical measure; and including the first plurality of digital training images and the labels in the training data set, wherein each label relates to a relevance level for a group of pixels in an image among the first plurality of digital training images and each label is used as ground truth for the group of pixels when training the neural network; and using the training data set as an input for training of the neural network.

2. The method of claim 1, wherein determining the training data set comprises:

for a second plurality of digital training images, determining a relevance level for groups of pixels in each specific digital training image of the second plurality of digital training images by using a second image analysis algorithm configured to automatically label the group of pixels with a relevance level, wherein the second image analysis algorithm differs from the first image analysis algorithm.

3. The method of claim 2, wherein the second plurality of digital training images comprises at least one digital training image being part of the first plurality of digital training images.

4. The method of claim 2, wherein the second plurality of digital training images comprises at least one digital training image not being part of the first plurality of digital training images.

5. The method of claim 1, wherein the training data set is further determined by manually label groups of pixels in at least one digital training image among the first plurality of digital training images with a relevance level.

6. The method of claim 2, wherein the training data set is further determined by manually label groups of pixels in at least one digital training image among the second plurality of digital training images with a relevance level.

7. A non-transitory computer-readable storage medium including instructions, which when executed by a device having a processing capability, cause the device to execute instructions for training a neural network that receives a plurality of input digital images and for each specific input digital image outputs data for determining a relevance level for groups of pixels in the specific input digital image, the instructions causing the device to perform operations comprising:

determining a training data set by:

for a first plurality of digital training images, determining a relevance level for groups of pixels in each specific digital training image of the first plurality of digital training images by using a first image analysis algorithm configured to automatically label the group of pixels with a relevance level, wherein the first image analysis algorithm is configured to automatically label the group of pixels with a relevance level by:

calculating a spatial statistical measure for the group of pixels;

calculating a temporal statistical measure for the group of pixels by applying a temporal filtering on a sequence of images of the first plurality of digital training images, the sequence of images including the specific digital training image;

calculating a weighted statistical measure by weighting the temporal statistical measure and the spatial statistical measure for the group of pixels; and labeling the group of pixels with a relevance level based on the weighted statistical measure; and including the first plurality of digital training images and the labels in the training data set, wherein each label relates to a relevance level for a group of pixels in an image among the first plurality of digital training images and each label is used as ground truth for the group of pixels when training the neural network; and using the training data set as an input for training of the neural network.

8. A computer comprising a processor arranged for training a neural network that receives a plurality of input digital images and for each specific input digital image outputs data for determining a relevance level of groups of pixels in the specific input digital image, wherein the training of the neural network comprises:

determining a training data set by:

for a first plurality of digital training images, determining a relevance level for groups of pixels in each specific digital training image of the first plurality of digital training images by using a first image analysis algorithm configured to automatically label the group of pixels with a relevance level, wherein the first image analysis algorithm is configured to automatically label the group of pixels with a relevance level by:

calculating a spatial statistical measure for the group of pixels;

calculating a temporal statistical measure for the group of pixels by applying a temporal filtering on a sequence of images of the first plurality of digital training images, the sequence of images including the specific digital training image;

calculating a weighted statistical measure by weighting the temporal statistical measure and the spatial statistical measure for the group of pixels; and labeling the group of pixels with a relevance level based on the weighted statistical measure; and including the first plurality of digital training images and the labels in the training data set, wherein each label relates to a relevance level for a group of pixels in an image among the first plurality of digital training images and each label is used as ground truth for the group of pixels when training the neural network; and using the training data set as an input for training of the neural network.

* * * * *